UNITED STATES PATENT OFFICE.

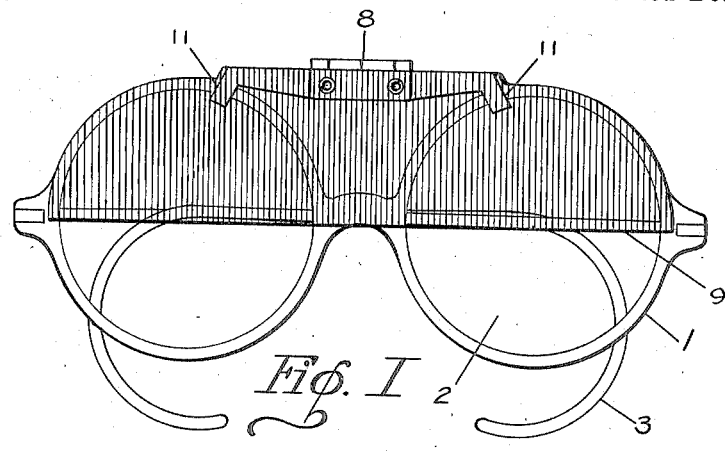
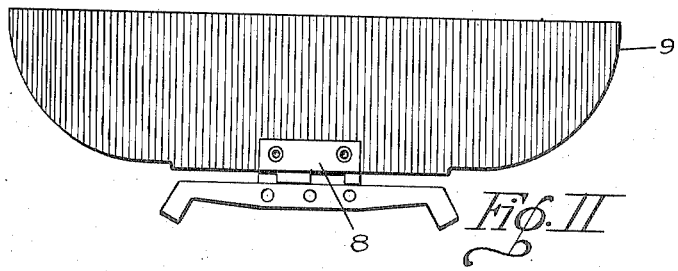
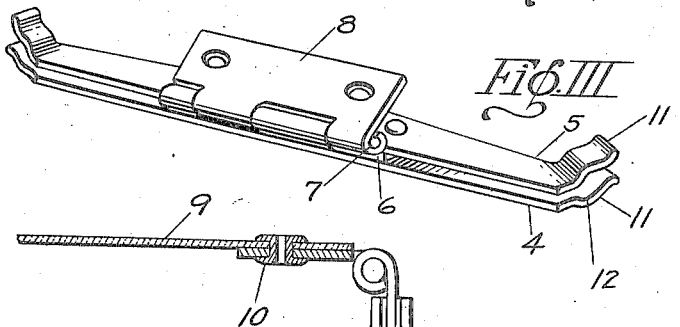
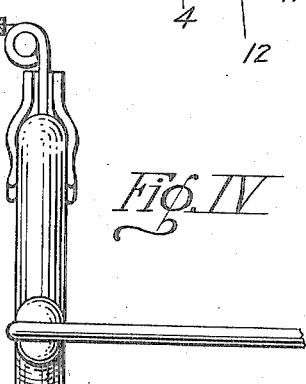

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,249,908.      Specification of Letters Patent.      Patented Dec. 11, 1917.

Application filed July 10, 1916. Serial No. 108,391.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings, and has particular reference to improved mountings adapted to shade or protect the eye of the wearer from undue light or glare.

One of the leading objects of the present invention is the provision of an improved attachment for an ophthalmic mounting which will serve as a shade to protect the eyes from overhead light or the like, or whose position may be varied to render the mounting equipped therewith capable for use as a night driving glass or the like, to protect the eyes from direct glare.

A further object of the present invention is the provision of an improved device which may be readily applied to or removed from any ordinary type of ophthalmic mounting, and which may be slipped into the pocket or other receptacle in an extremely compact form when not in use.

A further object of the invention is the provision of an improved detachable shade particularly adapted for use in connection with ophthalmic mountings, which may be placed at any desired angle relative to the mounting as a raised awning or shade, a lowered awning covering the upper part of the glasses, or may be temporarily swung upward out of the way when not required for use.

Other objects and advantages of the present construction should be readily apparent by reference to the following description taken in connection with the accompanying drawings, and it will be understood that I may make any modifications of the specific details of construction shown and described within the scope of the appended claim, without departing from, or exceeding the spirit of my invention.

Figure I represents a front view of a mounting equipped with my improvement.

Fig. II represents a view of my attachment in raised position.

Fig. III represents a perspective view of the attaching portion thereof, and

Fig. IV represents a fragmentary end view of an ophthalmic mounting with my device applied thereto and illustrated partially in elevation and partially in section.

In the drawings, in which similar characters of reference are employed to denote corresponding parts throughout the several views, the numeral 1 designates the frame or rim of a pair of spectacles, said rim serving to retain in position the usual lenses, 2, and being equipped with temples 3 for securing the mounting in position on the face of the wearer, the foregoing parts forming an ordinary well known form of spectacle construction.

Applied to this frame is my improved eye shade or shield member, which I have shown as formed from the pair of resilient strips of material 4 and 5, having centrally secured there between the hinge ear 6 connected as by the pintle 7 with second hinge ear 8 which carries the shield or shade member 9, the shade member being secured to the hinge ear 8 in any desired manner as by the rivets 10, particularly illustrated in Fig. IV.

It will be noted that the members 4 and 5 have the offset end 11, said ends 11 each being formed with an ogee type curve. It will thus be seen that the two adjacent ends are provided with flaring lips to facilitate their positioning over a frame, the edge of a lens or the like, and with the widened portion 12 inclosed between the curves and adapted to fit around a lens frame or the like to more securely retain the device in position.

Certain of the uses of my invention should be readily apparent by reference to Figs. I and IV of the drawing. It will be noted that in Fig. I, I have shown the translucent or transparent shade member 9 as folded down to overlie the upper half of the lenses 2 to provide a shade at this point to filter or cut down the light coming through the upper part of the lenses onto the eye so that the mounting may be worn either for general outdoor wear, when a semi shade for the eyes is desired, or may be used for night driving of automobiles or the like in which event the user ordinarily looks through the clear lower portion 2 of the lenses, but when desired may tilt the head to cause the line of vision to pass through the shield or shade member 9.

On the other hand the device may be employed as indicated in Fig. IV, for example, in which the shield is in raised position as when an entirely clear vision ahead is desired with some overhead shading effect, or may be swung partially downward as at an angle of 45 degrees in place of 90 degrees for additional shading effect.

A further advantage of my improved construction is that the device may be worn by ball players or the like, particularly in the outfield in which event the shield member will normally be in raised position as shown in Fig. IV, in order that the player may best watch the game, and at the same time have a certain amount of shield from the glare of the sun overhead, but may be quickly swung downward over the lenses as when it is necessary for the player to look up into the air to catch a fly ball. An additional advantage of this construction for ball players' use lies in the fact that the shield is preferably made from celluloid or other non-breakable material and thus serves in addition as a protection for the glasses of the user and renders their breakage less liable.

From the foregoing description taken in connection with the drawings, the construction, use and advantages of my improved device should be readily apparent and it will be understood that it may be quickly snapped on to any ophthalmic mounting or the like as desired, or readily removed therefrom and placed in the pocket. Further, it will be understood that the hinge formed by the members 6, 7 and 8 is preferably provided with a suitable friction or tension which will hold the shield in any desired adjusted position.

I claim:

The combination with an ophthalmic mounting, of a pair of strips arranged in spaced parallel relation, a hinge member centrally secured between said strips and having one ear thereof swinging free of the strips, a shade secured to the free ear of the hinge and adapted to be disposed in various positions with respect to the strips, and opposed curved portions formed on the ends of said strips for detachable engagement with the upper portion of the mounting, said ends having clamping engagement with the mounting to hold the shade in a plane parallel to the plane of the lenses.

In testimony whereof I affix my signature in the presence of two witnesses.

GEORGE H. DAY.

Witnesses:
H. K. PARSONS,
E. M. HALVORSEN